United States Patent

[11] 3,600,704

[72] Inventors Conrad M. Banas
 Manchester;
 Allan P. Walch, Manchester; Albert W. Angelbeck, East Hartford, all of, Conn.
[21] Appl. No. 710,697
[22] Filed Feb. 23, 1968
[45] Patented Aug. 17, 1971
[73] Assignee United Aircraft Corporation
 East Hartford, Conn.

[54] GAS LASER
 10 Claims, 5 Drawing Figs.
[52] U.S. Cl. .................................................. 331/94.5, 330/43
[51] Int. Cl. .................................................. H01s 3/22
[50] Field of Search ........................................ 331/94.5

[56] References Cited
OTHER REFERENCES
Tiffany et al., Desk-Size Carbon-Dioxide Unit Delivers a Kilowatt C–W, 5 Laser Focus 48— 51.

*Primary Examiner*—Rodney D. Bennett, Jr.
*Assistant Examiner*—Daniel C. Kaufman
*Attorney*—Melvin Pearson Williams

ABSTRACT: $CO_2$ particles, including small particles for laser chamber cooling and large particles for remote mixing purposes, are injected into the stream of an excited energizing gas in a gas laser, the solid $CO_2$ subliming to a gas, becoming excited through resonant collision energy transfer with the energizing gas, and emitting photons so as to generate the laser output.

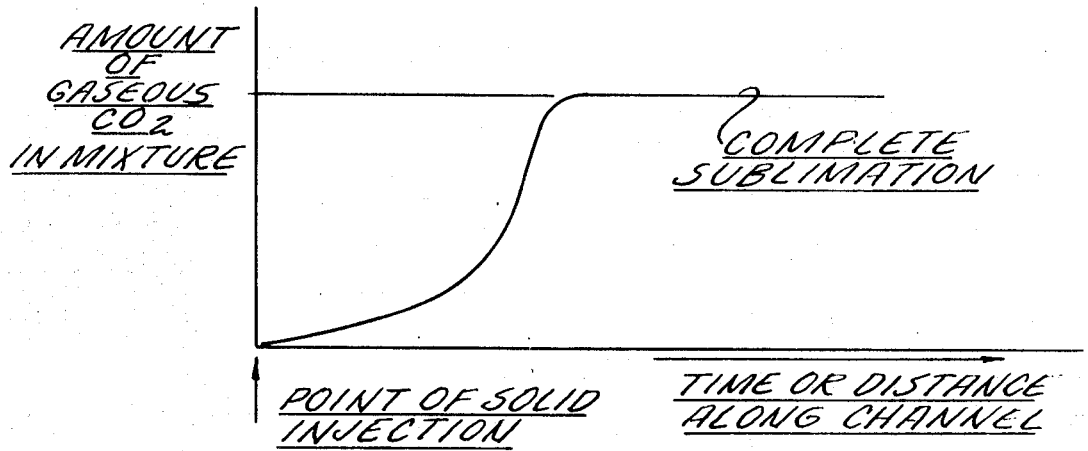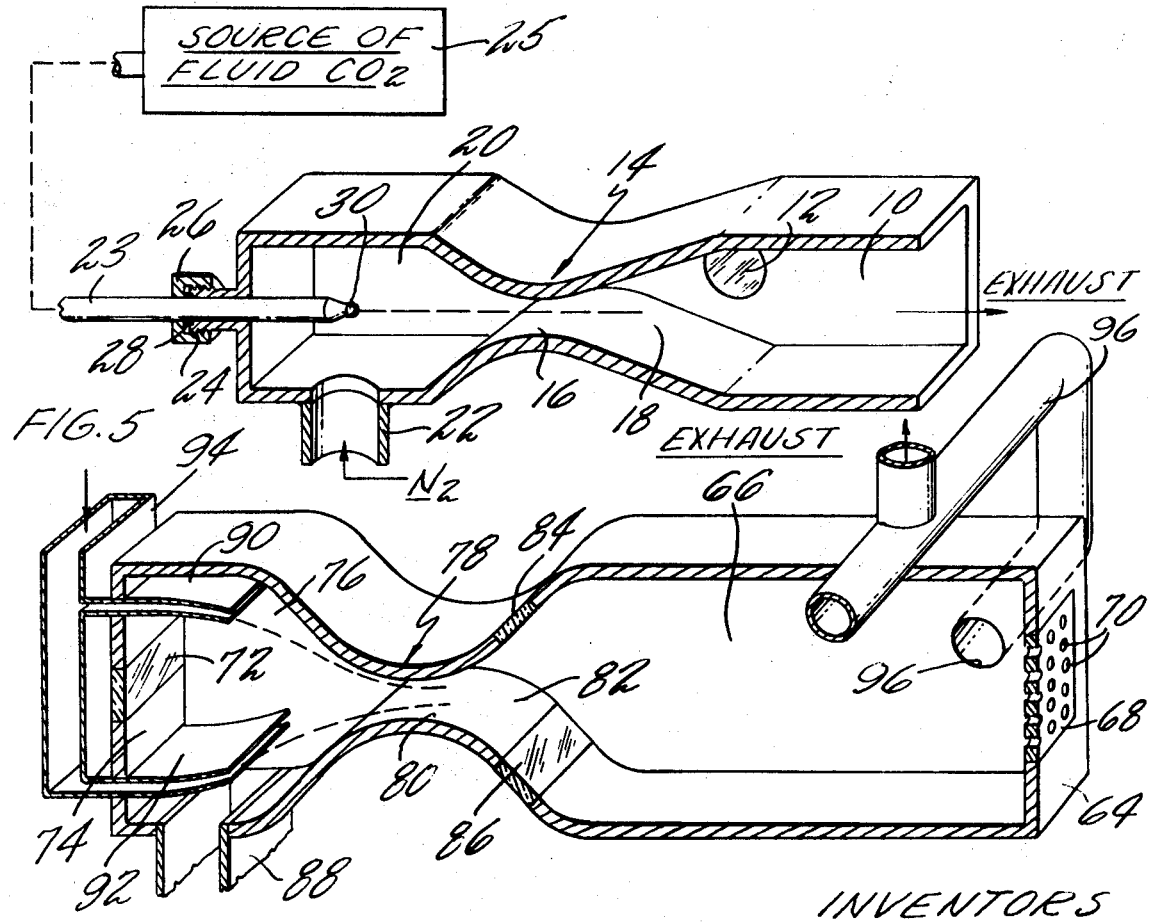

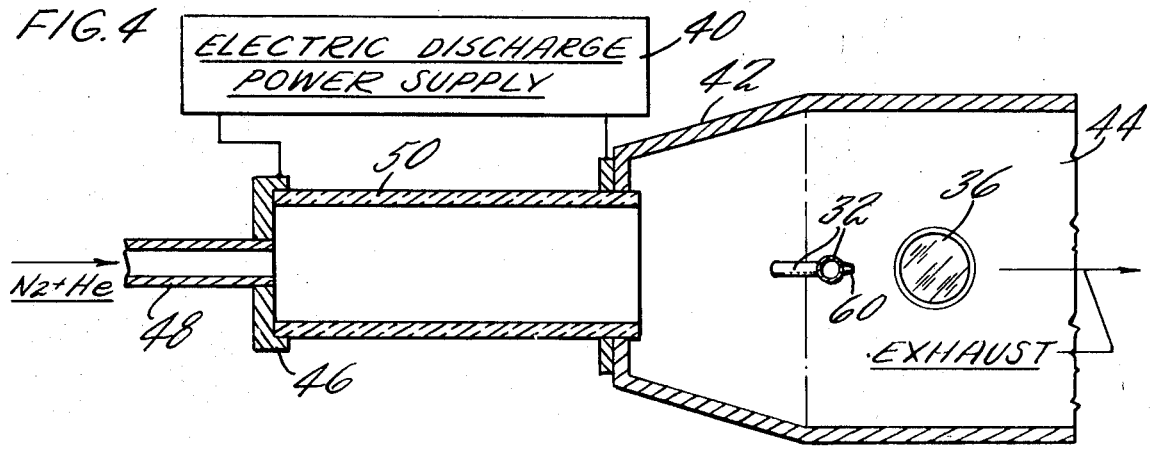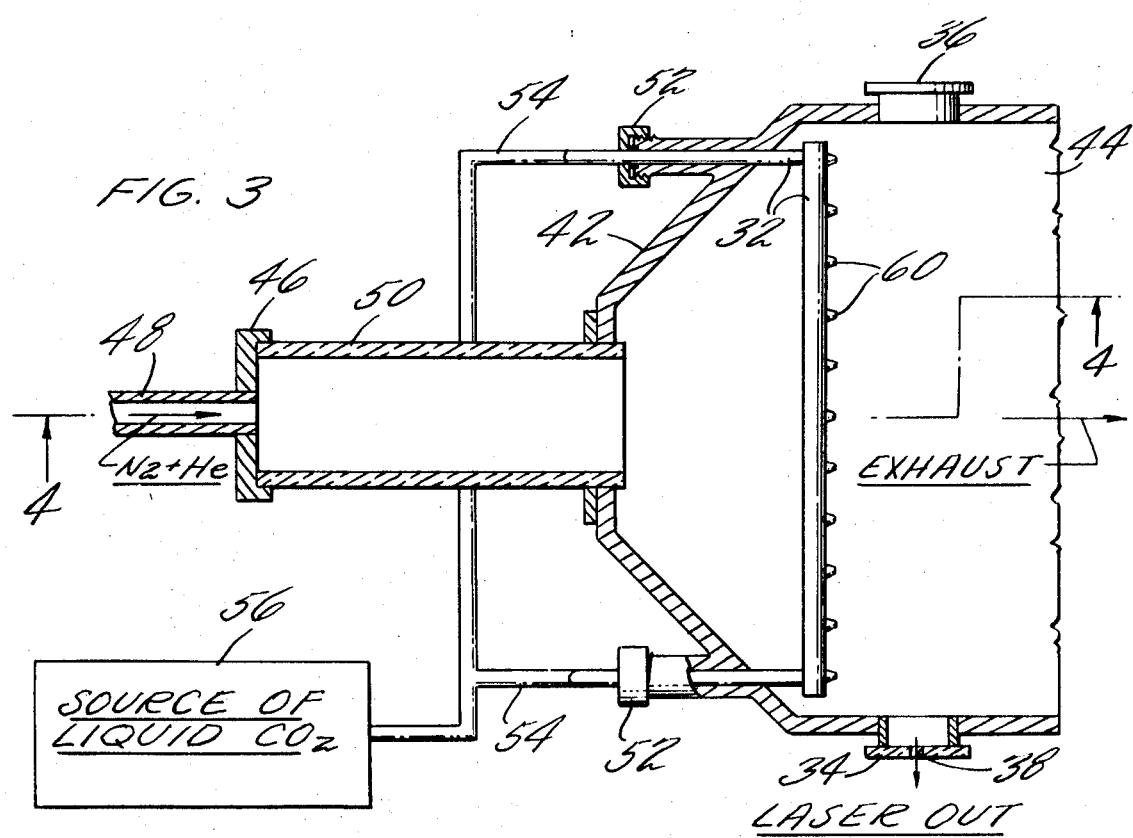

GAS LASER

CROSS-REFERENCE TO RELATED APPLICATIONS

A high-power gas mixing laser with thermal excitation is disclosed in a copending application of the same assignee entitled "Gas Mixing Laser," filed on even date herewith by B. R. Bronfin et al., Ser. No. (UAC Docket No. R-1096). A gas mixing laser with electric excitation is shown in a copending application of the same assignee filed on even date herewith by C. O Brown et al. entitled "Electrically Excited Gas Mixing Laser," Ser. No. (UAC Docket No. R-1229). A system for mixing a lasing substance, with adjustability, is disclosed in a copending application of the same assignee filed on even date herewith by E. A Pinsley et al. entitled "Internal Injection System for Gas Mixing Laser," Ser. No. (UAC Docket No. R-1228).

SUMMARY OF THE INVENTION

The object of the present invention is to provide improvements in the intermixing of the lasing substance with an energizing gas in a gas mixing laser.

In accordance with the present invention, small particles of solid carbon dioxide are injected into the stream of energizing gas in a gas mixing laser. In further accord with the present invention, the particles of solid carbon dioxide may be formed by rapidly expanding fluid carbon dioxide (either liquid or gas) as it is injected into the stream of energizing gas, or by other standard atomizing techniques. In accordance with another aspect of the present invention, the particles of $CO_2$ may be relatively large so as to require a relatively long time to sublime completely, and these particles may be injected into the stream of energizing gas some distance upstream of the optical cavity, so that an effective delayed injection of gaseous $CO_2$ is achieved. This utilization of the present invention avoids the necessity of injecting a gas within a supersonic flow area, which may cause shock waves and provide mixing problems. In accordance with a further aspect of the present invention, relatively small particles of solid carbon dioxide may be injected into the stream of energizing gas so that sublimation occurs very rapidly and is completed in a short zone within or close to the optical cavity, thereby cooling the lasing area as a result of the energy absorbed in the sublimation process.

The foregoing and other objects, features and advantages of the present invention will become more apparent in the light of the following detailed description of preferred embodiments thereof as illustrated in the accompanying drawings.

BRIEF DESCRIPTION OF THE DRAWING

FIG. 1 is a simplified plot of the sequence of particle sublimation.

FIG. 2 is a simplified sectioned perspective of a first embodiment of the invention;

FIG. 3 is a sectioned plan view of a second embodiment of the invention;

FIG. 4 is a sectioned side elevation view taken along the line 4—4 of the embodiment of FIG. 3; and FIG. 5 is a simplified sectioned perspective of an axial flow embodiment of the present invention.

THEORETICAL BACKGROUND

Well-known methods of kinetic theory can be utilized to estimate the time required for complete sublimation of a particle (e.g. $CO_2$). The analysis includes the effect of decreasing particle size (as in a melting snowball) and the effects of particle vapor pressure, and the temperature and partial pressure of the constituents of the environment within which the particle sublimes. It is noted that the partial pressure of the lasing substance which has been injected in solid form will increase with distance along the nozzle as may be inferred from FIG. 1. The increased partial pressure will tend to reduce the sublimation rate. On the other hand the sublimation rate per unit mass will be increased because the ratio of surface area to particle mass increases inversely as the particle radius. Another factor which tends to increase sublimation rate is that the particle vapor pressure increases exponentially with decrease in particle size. This effect becomes significant for submicron size particles. Since the vapor pressure of the solid $CO_2$ is considerably larger than the partial pressure of $CO_2$ in the gas mixture, the influence of increasing partial pressure on sublimation rate will be relatively small. Thus, the latter two effects will predominate, and sublimation rate will increase rapidly as particle size diminishes; that is, the rate of $CO_2$ gas evolution will increase with distance along the nozzle up to the limit of complete sublimation.

Assuming, as an example, a 250-micron diameter particle (approximately ten-thousandths of an inch), and utilizing standard values of properties for carbon dioxide, it can be calculated that the time required for complete sublimation is approximately 8 milliseconds. For an average flow velocity into a laser chamber of 100 feet per second, the particle would travel roughly 9 inches in the time required for sublimation. The nature of the sublimation process, as illustrated in FIG. 1, indicates that during the first 4 inches (in the example), substantially less than half of the $CO_2$ added will be in a gaseous form and during the last 4 inches substantially more than half will transfer into the gaseous state.

If the particle size, however, is one-tenth of that assumed in the preceding paragraph, to wit, of 25-micron diameter (about one-thousandths of an inch), then the mass of the particle is only one-thousandth of the mass assumed in the previous example and the surface of the particle is one-hundredth of the previous, so the initial sublimation rate per unit mass is 10 times as high. As a consequence, the approximate time for sublimation of all particles, when they are initially 25 microns in diameter, is roughly 0.8 millisecond. Thus, total sublimation would take place over a span of approximately 0.7 inch in a 100 ft./sec. gas flow. The effect of decreasing particle size on vapor pressure has been neglected in this example. This effect will further reduce sublimation time and distance.

It can be seen therefore that the span of gas flow over which sublimation takes place can readily be controlled by controlling particle size. Particle size can, of course, be controlled by increasing pressure and decreasing nozzle diameter for a decrease in particle size, or very small particles can be achieved by utilizing centrifugal or two-fluid nozzle atomization. The former technique is well known in the chemical process industry while the latter is well known in the generation of artificial snow for ski slopes. Very small particle sizes, even as small as 10 microns in diameter, can be achieved by proper selection of operating conditions.

The foregoing analysis, of course, assumes that all particles are of the same size. In actuality, particles formed by any one of the above processes will have a range of sizes. Therefore, not all particles will sublime in the length of time and the completion of sublimation of the particles will not be achieved in an identical span of gaseous flow within the system. However, assuming a Gaussian distribution, it may be estimated that a major fraction of the particles will sublime within a meaningful distance in comparison with the effective lasing sizes which can be built into optical systems used in either the oscillating or amplifying types of lasers. The actual spread in sublimation distance will, of course, decrease with particle size. The distance over which sublimation takes place can be much greater in an amplifying-type laser where several reflections occur across the gaseous flow, and larger optical systems can be utilized in oscillating-type lasers so as to derive maximum output from a distributed emission of photons over some length of the gaseous flow.

A further assumption made in the above examples is that the rate of gas evolution is limited by sublimation rate rather than by the rate of heat transfer to the particles. This assumption is justified in that the heat transfer coefficients for surfaces undergoing a phase change are extremely large. Further, the driving temperature difference for the heat transfer process is quite large in a gas laser system (400°—3000° F.) so that ample energy transfer to the particles is facilitated. Since the change in heat transfer rate to the particles is not expected to influence sublimation rate under the assumed flow conditions, sublimation has been estimated from the properties of the solid $CO_2$ particles alone.

DESCRIPTION OF PREFERRED EMBODIMENT

Referring to FIG. 2, a laser chamber 10 includes an optical cavity, one mirror 12 of which is shown. The laser chamber 10 may include a nozzle 14 having a throat 16 and an expansion area 18. Gaseous flow enters the nozzle 14 from a plenum chamber 20 which is fitted with a duct 22 for the entrance of an energizing gas, such as excited molecular nitrogen. The plenum chamber 20 may be suitably adapted to receive an injection tube 23 through which fluid $CO_2$ may be introduced into the laser from a source 25. This tube may be suitably held by a well-known form of quick release slide fitting including a threaded shank 24 formed integrally with the walls of the plenum chamber 20 (or otherwise attached thereto), a threaded cap portion 26, and an O-ring 28 which may be mildly compressed between the cap 26 and the shank portion 24 so as to provide a seal for gaseous pressure inside the plenum chamber 20 while permitting sliding of the tube 23. In the embodiment of FIG. 2 the tube 23 may preferably be connected to the source 25 of fluid carbon dioxide, and it is provided with a converging-diverging nozzle 30 so that as fluid carbon dioxide flows into the chamber 20 from the tube 23 it is rapidly expanded, which causes it to cool to such a degree that it forms solid particles. These particles are directed at the throat 16 of the nozzle 14, and are carried along by the flow of energizing gas which is introduced into the chamber 20 by the duct 22. The energizing gas is heated to a relatively high temperature (such as 1500° C., as described hereinbefore) so as to provide the energy level necessary for transfer to the carbon dioxide. However, even electrically excited nitrogen is at a sufficiently high temperature so as to provide energy to the solid carbon dioxide, at a rate sufficient to permit the solid particles of carbon dioxide to sublime. The sublimation can be controlled, as described hereinbefore, so that the carbon dioxide becomes substantially gaseous prior to entering the optical cavity, which is represented in FIG. 2 by the mirror 12. When the $CO_2$ becomes gaseous, it is capable of absorbing energy, at vibrational levels, from the energizing gas through resonant collisions, as is described in the aforementioned copending patent applications. Thus, the apparatus of FIG. 2 provides gaseous injection in the supersonic flow at the optical cavity 12 by injecting solid $CO_2$ into the subsonic flow within the chamber 20. To utilize this embodiment of the invention in this fashion, one would use large-size particles (such as the 250-micron diameter particles described hereinbefore).

FIGS. 3 and 4 are plan and side views, respectively, of another embodiment of the present invention wherein $CO_2$ may be injected by means of a rod 32 of the type described in the aforementioned Brown et al. application. The rod 32 is positioned just upstream of an optical cavity formed by a pair of mirrors 34, 36, the mirror 34 having therein a hole 38 through which the laser output is coupled. By utilizing small particles (such as the 125-micron particles described hereinbefore) solid $CO_2$ formed by releasing a fluid through the rod 32 will sublime by the time it enters the optical cavity 34—38, and lasing will occur. In addition, sublimation occuring at the optical cavity tends to cool the region within which lasing occurs, and therefore assists in depopulating the lower laser level of the lasing substance (which here is $CO_2$), thereby preventing population saturation which tends to lower the output power obtainable in a gas laser, as is described in the aforementioned Bronfin et al. application. In the embodiments of FIGS. 3 and 4, an electric discharge power supply 40 (shown only in FIG. 4 for simplicity) is attached to the metallic structure 42 which forms the laser chamber 44 and to an attaching ring 46. The ring 46 permits the sealing off of a tube 48 from a source of energizing gas (such as nitrogen and helium) and also provides a means of establishing an electric potential difference across the electric discharge tube 50, (FIGS. 3 and 4). This sort of electric discharge apparatus is disclosed in the aforementioned Brown et al. and Pinsley et al. applications. The injection rod 32 may be connected through suitable couplings 52 of the type described in the aforementioned Pinsley et al. application to a manifold 54 which connects to a source 56 of fluid $CO_2$. Thus, fluid $CO_2$ flows through the rod 32 and passes through converging nozzles 60; as the fluid $CO_2$ enters the laser chamber 44 it expands rapidly and becomes solidified. Because there can be a high flow of energizing gas past the rod 32, this will cause the formation of very fine particles so that rapid sublimation of the solid particles will take place.

In FIG. 5 is illustrated an additional embodiment of the present invention wherein, instead of having a traverse laser cavity as illustrated in FIGS. 2 and 4, the laser cavity is axial with respect to the flow of energizing gas, and an offcenter type of $CO_2$ injection may be utilized so as to permit a mirror to be centered on the rear wall.

Specifically, in the apparatus of FIG. 5, an end wall 64 of the laser chamber 66 includes an optical cavity mirror 68 having output coupling holes 70 therein. The optical cavity is formed with a mirror 72 which is disposed in an opposite end wall 74 of a plenum 76. Between the plenum 76 and the laser chamber 66 is a nozzle 78 including a throat 80 and an expansion area 82. Within the nozzle 78 are a pair of mirrors 84, 86 which are disposed at a 45° angle to the nozzle axis. The flow through the laser, in this case, is parallel with the axis of the optical cavity 68, 72. The flow of energizing gas into the plenum 76 may be through a duct 88 from a suitable source of excited energizing gas, such as nitrogen, carbon monoxide, or other gases mentioned in the aforementioned copending patent applications. Carbon dioxide may be introduced into the plenum 76 by a pair of ducts 90, 92 which are connected to a main feeder duct 94 from a source of carbon dioxide which may be either liquid or gaseous depending upon specific design parameters of a system incorporating the present invention. The ducts 90, 92 are slightly bent so as to direct the flow of carbon dioxide toward the throat 80 of the nozzle 78. The flow of gases through the laser is exhausted through ducts 96 which may be connected to a suitable pump, of necessary, so as to supply the proper pressure and flow rates through the laser.

The embodiment of FIG. 5 is illustrated as being of rectangular cross section; however, this could be modified so as to be of a circular cross section wherein the ducts 90, 92 would take the form of a single angular duct surrounding a circular mirror 72.

The invention herein is particularly directed toward the use of a solid lasing substance so as to achieve operational advantages in gas dynamic mixing lasers. The invention is particularly well adapted to the use of carbon dioxide as a lasing substance, which is readily formed into solid particles as it enters the laser, the sublimation rate of which may be readily controlled by controlling the size of particles generated, as described hereinbefore. Several exemplary embodiments have been shown, and it should be appreciated that the invention may be practiced in a variety of gas mixing lasers. In fact, the invention may be utilized in any gas mixing laser of the molecular or chemical type wherein vibrational and rotational energy levels predominate in the operation, and for which solid particles of the lasing substance may be readily formed. Various gas mixing laser systems in which the present invention may be utilized are described in the aforementioned copending patent applications.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of our invention, that which we claim as new and desire to secure by Letters Patent of the United States is:

1. In the method of laser radiation in the optical cavity of a gas laser utilizing a gaseous flow comprising an energizing gas in a highly energized state, the step of:
   injecting solid particles of lasing substance into said gaseous flow at a point in said flow with respect to said optical cavity so as to permit sublimation of substantially all of said lasing substance within or upstream of said optical cavity.

2. The method according to claim 1 wherein said energizing gas comprises molecular nitrogen and said lasing substance comprises carbon dioxide.

3. In the production of laser radiation within the optical cavity of a laser, the steps of:
   heating a gas including at least an energizing gas;
   directing the flow of heated gas toward an expansion nozzle;
   introducing into the flow of heated gas a lasing substance in solid particle form at a point in the flow relative to the position of said expansion nozzle so that a substantial portion of said lasing substance will sublime at, or upstream of said expansion nozzle;
   flowing the mixture of heated gas and lasing substance through said expansion nozzle; and
   flowing the expanded gas mixture through an optical cavity.

4. The method according to claim 3 wherein said energizing gas comprises molecular nitrogen and said lasing substance comprises carbon dioxide.

5. In the production of laser radiation within the optical cavity of a laser, the steps of:
   heating a gas including at least an energizing gas;
   flowing the heated gas through an expansion nozzle;
   introducing into the flow of the expanded gas a lasing substance in solid form at a point within said flow relative to said optical cavity so as to provide intimate mixing of sublimed lasing substance with energizing gas within said optical cavity; and
   flowing the mixture of expanded gas and sublimed lasing substance through the optical cavity.

6. The method according to claim 5 wherein said energizing gas comprises molecular nitrogen and said lasing substance comprises carbon dioxide.

7. A gas laser adapted for connection with a source of gas including at least a substantial percentage of an energizing gas and adapted for connection with a fluid source of lasing substance, comprising:
   a lasing chamber;
   means for heating said energizing gas so that a substantial portion thereof is brought to at least a given excited energy level;
   means for converting said lasing substance from a fluid to fine solid particles of said lasing substance and for introducing the particles of said lasing substance into the gaseous output of said heating means;
   means for rapidly cooling the mixture of said heated gas and the lasing substance so that a substantial portion of the excited energy levels within gas are preserved while said gas flow is cooled;
   means for flowing said gas from said heating means and the mixture of said gas and said substance through said cooling means and through said lasing chamber; and
   an optical cavity in said lasing chamber, said optical cavity positioned relative to the introduction of said lasing substance into said heated gas and positioned with respect to said cooling means so that said lasing substance is in substantially the gaseous state as it enters said cavity, and resonant energy transfer by collisions occurs between said heated gas and said substance at, or upstream of said optical cavity.

8. The laser according to claim 7 including a source of molecular nitrogen energizing gas and a source of fluid carbon dioxide lasing substance.

9. A gas mixing laser comprising:
   a laser chamber having an optical cavity positioned therein;
   means for providing a flow of energizing gas through said optical cavity; and
   means disposed within the laser chamber in close proximity with the optical cavity for introducing fine particles of a solid lasing substance into the laser chamber at a point with respect to said optical cavity so that substantially all of the lasing substance sublimes and intermixes with said energizing gas at a point within said optical cavity.

10. The laser according to claim 9 wherein said energizing gas comprises molecular nitrogen and wherein said lasing substance comprises carbon dioxide.